(12) United States Patent
Hagiuda (10) Patent No.: US 7,966,326 B2
(45) Date of Patent: Jun. 21, 2011

(54) INFORMATION PROCESSING APPARATUS, DATA COMMUNICATION APPARATUS, CONTROL METHODS THEREFOR, ADDRESS MANAGEMENT SYSTEM, AND PROGRAM

(75) Inventor: Tadashi Hagiuda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 513 days.

(21) Appl. No.: 11/606,136

(22) Filed: Nov. 30, 2006

(65) Prior Publication Data

US 2007/0130135 A1 Jun. 7, 2007

(30) Foreign Application Priority Data

Dec. 5, 2005 (JP) ................................ 2005-351313

(51) Int. Cl.
*G06F 7/00* (2006.01)
*G06F 17/30* (2006.01)
(52) U.S. Cl. .................... 707/736; 707/770; 707/785
(58) Field of Classification Search ............... 707/9, 736
See application file for complete search history.

(56) References Cited

U.S. PATENT DOCUMENTS

| | | | |
|---|---|---|---|
| 6,845,448 B1* | 1/2005 | Chaganti et al. | 713/166 |
| 6,931,532 B1* | 8/2005 | Davis et al. | 713/167 |
| 6,978,381 B1* | 12/2005 | Te et al. | 726/18 |
| 7,039,951 B1* | 5/2006 | Chaudhari et al. | 726/7 |
| 7,589,857 B2 | 9/2009 | Oe | |
| 2002/0112015 A1* | 8/2002 | Haynes | 709/206 |
| 2004/0131190 A1* | 7/2004 | Nobel et al. | 380/282 |
| 2005/0002057 A1* | 1/2005 | Oe | 358/1.15 |
| 2005/0015592 A1* | 1/2005 | Lin | 713/166 |
| 2006/0106803 A1* | 5/2006 | Takeuchi et al. | 707/9 |
| 2006/0288222 A1* | 12/2006 | Dunkley | 713/176 |

FOREIGN PATENT DOCUMENTS

| | | |
|---|---|---|
| JP | 2002-041250 | 2/2002 |
| JP | 2005026876 A | 1/2005 |
| JP | 2005102133 A | 4/2005 |

OTHER PUBLICATIONS

Japanese Office Action dated Sep. 10, 2010 in corresponding Japanese Application No. 2005-351313.

* cited by examiner

*Primary Examiner* — Hung T Vy
*Assistant Examiner* — Binh V Ho
(74) *Attorney, Agent, or Firm* — Fitzpatrick, Cella, Harper & Scinto (57) ABSTRACT

An address book data download request issued from a data communication apparatus is received. On the basis of authority of a user of the data communication apparatus which has issued the download request and a security level set for each address information in address book data stored in a storage medium, address information is extracted from the address book data. Address book data containing the extracted address information is transmitted to the data communication apparatus.

12 Claims, 9 Drawing Sheets

INFORMATION PROCESSING APPARATUS, DATA COMMUNICATION APPARATUS, CONTROL METHODS THEREFOR, ADDRESS MANAGEMENT SYSTEM, AND PROGRAM

BACKGROUND OF THE INVENTION

1. Field of the Invention

The present invention relates to an address management system formed by connecting, via a network, a data communication apparatus and an information processing apparatus which manages address information used by the data communication apparatus.

2. Description of the Related Art

In recent years, it is becoming prevalent that a multi-function device connected to a network sends image data not only by facsimile transmission but also by e-mail attachment or a data transmission function such as an FTP.

It is conceivable that such a multi-function device has address book data which can register various kinds of destination (address) information such as a facsimile number, e-mail address, host name, and IP address.

Furthermore, it is also becoming prevalent that a server computer connected to a network manages such address book data and a plurality of multi-function devices download and use the address book data (e.g., see Japanese Patent Laid-Open No. 2002-41250).

However, the above prior art has no access limitation on a multi-function device which can download address book data. For this reason, a multi-function device installed in a usually inaccessible location is sometimes connected to a network communicable with a server computer which manages the address book data. If a user who operates the multi-function device has authority to download the address book data from the server computer, he/she can freely download the address book data.

Therefore, a multi-function device installed outside the network may hold address book data containing confidential destination address information of customers, which should not be leaked out. This leads to a decisive fault in terms of security.

SUMMARY OF THE INVENTION

The present invention has been made to solve the above problem, and has as its object to provide an information processing apparatus, a data communication apparatus, control methods therefor, an address management system, and a program which can improve security associated with address book data.

According to the present invention, the foregoing object is attained by providing an information processing apparatus which is connected, via a network, to a data communication apparatus that transmits data in accordance with address information, and manages the address information used by the data communication apparatus, comprising:

a first storage unit adapted to store address book data in which a security level is set for each address information of a transmission destination;

a first reception unit adapted to receive an address book data download request issued from the data communication apparatus;

a first extraction unit adapted to extract address information from the address book data on the basis of authority of a user of the data communication apparatus which has issued the download request and the security level set for each address information in the address book data; and a transmission unit adapted to transmit address book data containing the address information extracted by the first extraction unit to the data communication apparatus.

In a preferred embodiment, the apparatus further comprises:

a second reception unit adapted to receive the address book data from the data communication apparatus;

a second extraction unit adapted to extract address information from the address book data on the basis of authority of a user of the data communication apparatus which has issued the address book data received by the second reception unit; and a second storage unit adapted to store address book data containing the address information extracted by the second extraction unit.

In a preferred embodiment, a data communication apparatus including a data transmission unit and an operation unit which accepts a user's operation, comprising:

a first storage unit adapted to store address book data in which a security level is set for each address information of a transmission destination which is transmitted from the data transmission unit;

a first acquisition unit adapted to acquire authority of a user of the data communication apparatus on the basis of the operation at the operation unit;

a first extraction unit adapted to extract address information from the address book data on the basis of the user authority acquired by the first acquisition unit and the security level set for each address information in the address book data; and a first display unit adapted to display address book data containing the address information extracted by the first extraction unit.

In a preferred embodiment, the apparatus further comprises:

a second acquisition unit adapted to acquire authority of a user of the data communication apparatus on the basis of the operation at the operation unit when the user inputs an editing instruction for the address book data via the operation unit;

a second extraction unit adapted to extract address information from the address book data on the basis of the user authority acquired by the second acquisition unit and the security level set for each address information in the address book data; and a second display unit adapted to display an editing window for editing address book data containing the address information extracted by the second extraction unit.

In a preferred embodiment, the apparatus further comprises a transmission unit adapted to transmit the address book data containing the address information extracted by the first extraction unit to an information processing apparatus which is connected via a network and manages address information.

According to the present invention, the foregoing object is attained by providing an address management system formed by connecting, via a network, a data communication apparatus including a data transmission unit and an information processing apparatus which manages address information used by the data communication apparatus, the information processing apparatus including a storage unit adapted to store address book data in which a security level is set for each address information of a transmission destination, a first reception unit adapted to receive an address book data download request issued from the data communication apparatus, an extraction unit adapted to extract address information from the address book data on the basis of authority of a user of the data communication apparatus which has issued the download request and the security level set for each address information in the address book data, and a first transmission unit adapted to transmit address book data containing the address information extracted by the extraction unit to the data communication apparatus; and the data communication apparatus including a second transmission unit adapted to transmit authority of a user of the data communication apparatus to the information processing apparatus, and a second reception unit adapted to receive address book data corresponding to the user authority from the information processing apparatus.

According to the present invention, the foregoing object is attained by providing a method of controlling an information processing apparatus which is connected, via a network, to a data communication apparatus including a data transmission unit, and manages address information used by the data communication apparatus, comprising steps of:

receiving an address book data download request issued from the data communication apparatus;

extracting address information from the address book data on the basis of authority of a user of the data communication apparatus which has issued the download request and a security level set for each address information in the address book data stored in a storage medium; and transmitting address book data containing the address information extracted in the extracting step to the data communication apparatus.

According to the present invention, the foregoing object is attained by providing a storage medium storing a program for causing a computer to control an information processing apparatus which is connected, via a network, to a data communication apparatus including a data transmission unit, and manages address information used by the data communication apparatus, the program causing the computer to execute steps of:

receiving an address book data download request issued from the data communication apparatus;

extracting address information from the address book data on the basis of authority of a user of the data communication apparatus which has issued the download request and a security level set for each address information in the address book data stored in a storage medium; and transmitting address book data containing the address information extracted in the extracting step to the data communication apparatus.

According to the present invention, the foregoing object is attained by providing a method of controlling a data communication apparatus including a data transmission unit and an operation unit which accepts a user's operation, comprising steps of:

acquiring authority of a user of the data communication apparatus on the basis of the operation at the operation unit;

extracting address information from the address book data on the basis of the user authority acquired in the acquiring step and a security level set for each address information in address book data stored in a storage medium; and displaying address book data containing the address information extracted in the extracting step.

According to the present invention, the foregoing object is attained by providing a storage medium storing a program for causing a computer to control a data communication appara-
tus including a data transmission unit and an operation unit which accepts a user's operation, the program causing the computer to execute steps of:

acquiring authority of a user of the data communication apparatus on the basis of the operation at the operation unit;

extracting address information from the address book data on the basis of the user authority acquired in the acquiring step and a security level set for each address information in address book data stored in a storage medium; and displaying address book data containing the address information extracted in the extracting step.

Further features of the present invention will be apparent from the following description of exemplary embodiments with reference to the attached drawings.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically otherwise.

First Embodiment

Figure 1:
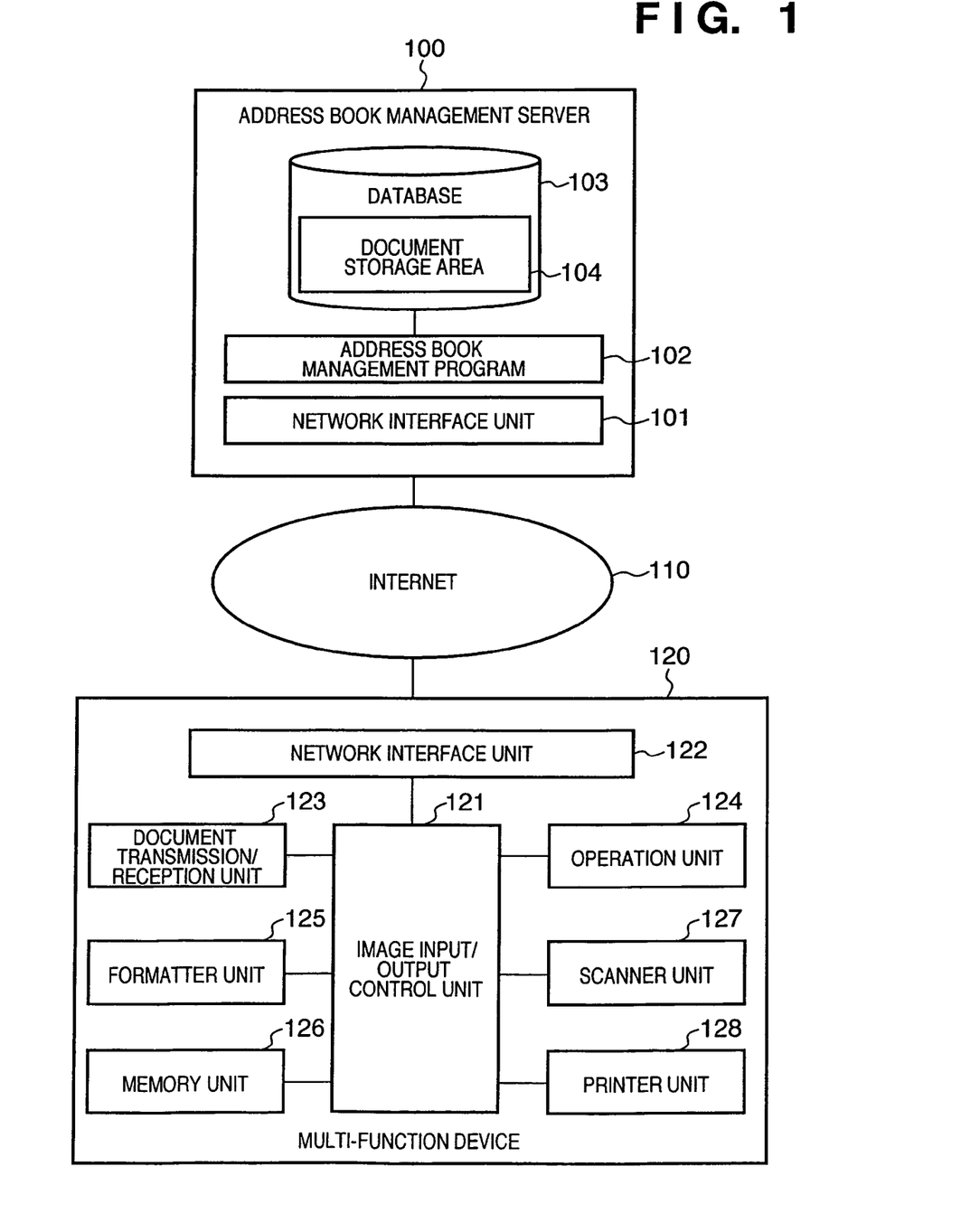
FIG. 1 is a block diagram showing the configuration of an address book management system according to the first embodiment of the present invention.

FIG. 1 is a block diagram showing the configuration of an address book management system according to the first embodiment of the present invention.

Referring to FIG. 1, reference numeral 100 denotes an address book management server; 110, the Internet; and 120, a multi-function device.

The address book management server 100 includes the following functional blocks.

Reference numeral 101 denotes a network interface unit. The network interface unit 101 serves to control various communication protocols and transmit/receive various kinds of data such as address book data.

Reference numeral 102 denotes an address book management program. The address book management program 102 causes the address book management server 100 to execute an authentication process, and acquires the user authority from the multi-function device 120. Additionally, the address book management program 102 edits address book data, including the setting of the security level of address information, and controls upload/download of address book data corresponding to a user's request.

A database 103 saves address book data generated on the address book management server 100 or uploaded from the multi-function device 120 together with security levels assigned to pieces of address information.

The address book management server 100 comprises standard constituent elements (e.g., a CPU, RAM, ROM, hard disk, external storage device, network interface, display, keyboard, and mouse) mounted in a general-purpose computer.

For example, a hard disk implements the database 103, and a ROM stores various programs including the address book management program 102.

Although FIG. 1 shows the Internet 110 as a data communication network, the present invention is not limited to this. For example, the data communication network may be one of a LAN, WAN, telephone line, dedicated digital line, ATM, frame relay line, communication satellite channel, cable television line, and data broadcasting radio channel. The data communication network may be a so-called communication network implemented by combining them if it can transmit/receive data.

The multi-function device 120 mainly comprises an image input/output control unit 121, network interface unit 122, document transmission/reception unit 123, operation unit 124, formatter unit 125, memory unit 126, scanner unit 127, and printer unit 128.

The present invention realizes the multi-function device 120 as an image processing apparatus having a plurality of functions such as an image input function, image output function, and image save function.

The image input/output control unit 121 connects to the network interface unit 122, document transmission/reception unit 123, formatter unit 125, memory unit 126, scanner unit 127, and printer unit 128 and systematically controls the functional blocks.

The image input/output control unit 121 executes various kinds of control by, e.g., causing the CPU to execute the program stored in the memory unit 126.

The network interface unit 122 is a functional module which controls communication with various network devices connected to the Internet 110. The network interface unit 122 receives job control data from a network device such as a computer and transmits/receives document data to/from it. The job control data contains a job control command transmitted together with PDL data. For example, the job control data rasterizes and prints PDL data as image data and staples/sorts and discharges the printed sheets.

The network devices include, e.g., a personal computer and multi-function device.

The document transmission/reception unit 123 connects to the Internet 110 via the image input/output control unit 121 and network interface unit 122. By utilizing various network communication protocols such as an SMTP or FTP, the document transmission/reception unit 123 transmits image data input from the scanner unit 127 or image data stored in the memory unit 126. Meanwhile, the document transmission/reception unit 123 receives data such as address book data from the address book management server 100.

The document transmission/reception unit 123 can perform mail transmission/reception, FTP transmission/reception, or facsimile transmission/reception using a fax line or network line.

The formatter unit 125 connects to the image input/output control unit 121. The formatter unit 125 rasterizes PDL data transmitted from a computer via the network interface unit 122 into image data so that the printer unit 128 can output it.

The memory unit 126 accumulates image data input from the scanner unit 127, address book data input via the operation unit 124, and address book data downloaded from the address book management server 100 via the network interface unit 122.

The memory unit 126 includes a RAM or ROM. The memory unit 126 stores various programs for executing various flowcharts to be described later.

The scanner unit 127 converts the contents of a scanned paper document into image data. The document transmission/reception unit 123 transmits the resultant image data to another network device on the network via the image input/output control unit 121 and network interface unit 122. It is also possible to accumulate this image data in the memory unit 126 or output it from the printer unit 128.

The printer unit 128 outputs PDL data transmitted from a network device via the network interface unit 122. Additionally, the printer unit 128 outputs image data received from a network device (computer or another multi-function device) on the network via the network interface unit 122.

The operation unit 124 allows the user to instruct, via a displayed operation window, the multi-function device 120 to output a document via the printer unit 128 or document transmission/reception unit 123 or input a document via the scanner unit 127. The operation unit 124 also allows the user to perform an operation to do authentication of the multi-function device 120 or access the address book management server 100. Furthermore, the operation unit 124 allows the user to generate, refer to, edit, and delete the address book data accumulated in the memory unit 126.

The operation unit 124 includes, e.g., a touch panel which integrates a display unit and input unit. Additionally, the operation unit 124 may include physical keys and buttons for various operations.

With the above arrangement, the multi-function device 120 can download, refer to, or edit address book data managed on the address book management server 100 and upload the resultant data to the address book management server 100 again.

Upon receiving the address book data, the address book management server 100 causes the address book management program 102 to control upload/download of the address book. A document storage area 104 saves that address book.

A download process for downloading address book data from the address book management server 100 to the multi-function device 120 in the address book management system according to the first embodiment will be explained next with reference to FIGS. 2A and 2B.

Figure 2A:
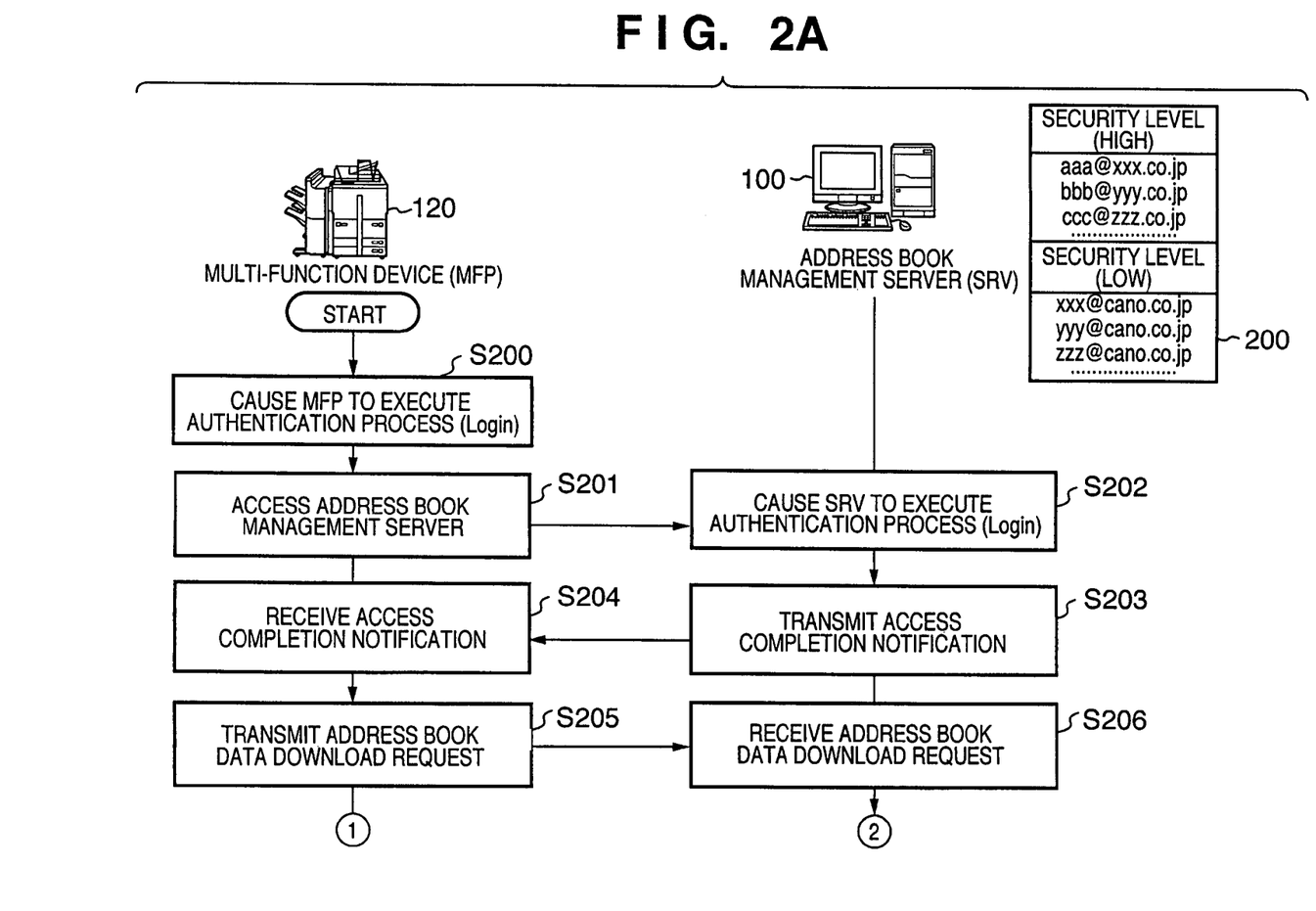
FIGS. 2A and 2B are flowcharts showing a download process in the address book management system according to the first embodiment of the present invention.
Figure 2B:
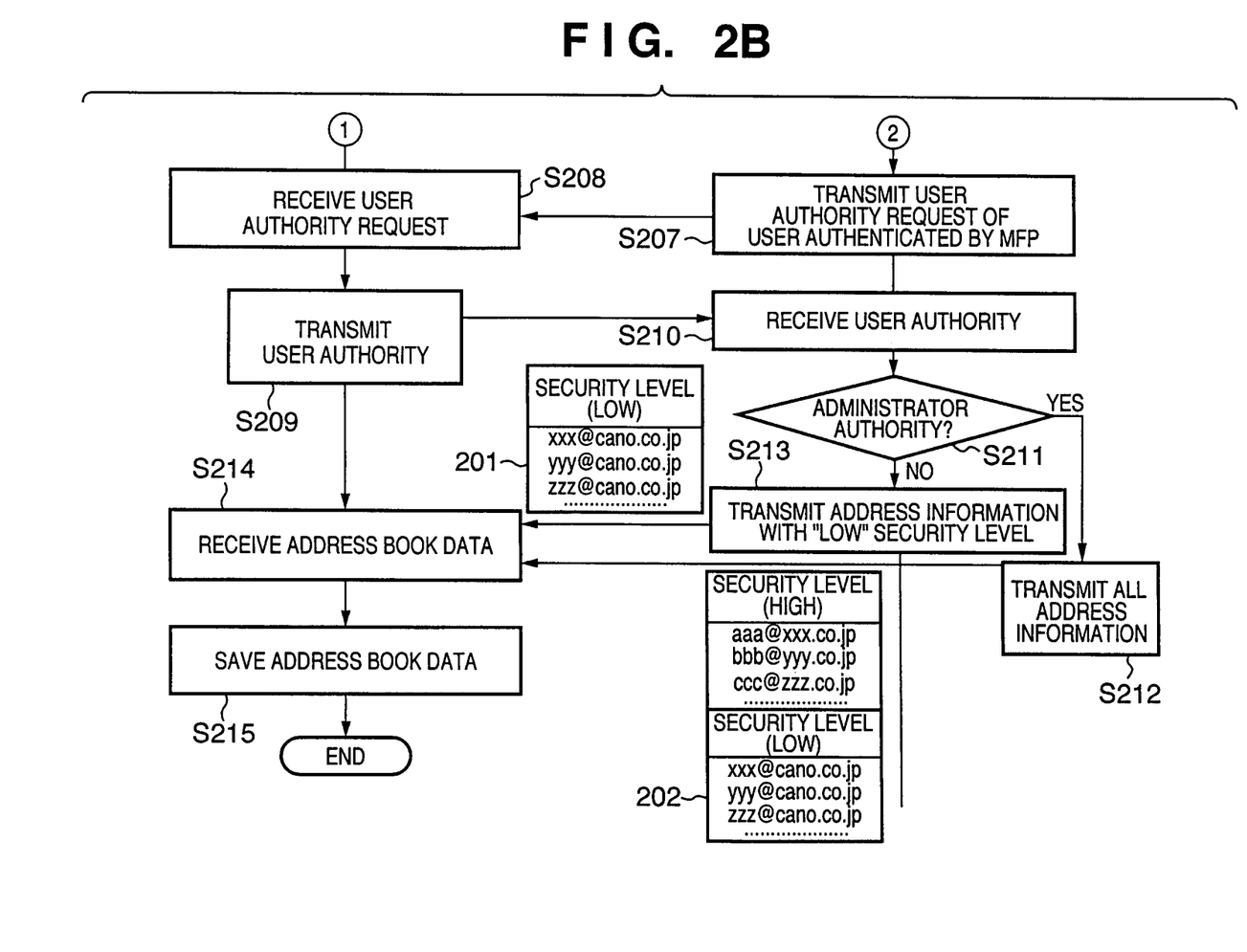

FIGS. 2A and 2B are flowcharts showing the download process in the address book management system according to the first embodiment of the present invention.

Appropriate security levels are assigned in advance to pieces of address information contained in the address book data on the database 103, which is managed by the address book management program 102 on the address book management server 100. Each security level defines user authority for a usable multi-function device 120.

The first embodiment employs two security levels, i.e., high and low. A user who has the administrator authority for the multi-function device 120 can use address information of any security level. User authority of any other type allows use of only address information of low security level.

Referring to FIGS. 2A and 2B, the address book management server 100 manages, as address book data 200, addresses of "high" security level including aaa@xxx.co.jp and bbb@yyy.co.jp. The address book management server 100 manages addresses of "low" security level including xxx@cano.co.jp and yyy@cano.co.jp. In this case, the user must not register a plurality of identical addresses. If the user is to register an address which has already been registered, the address book management server 100 displays a message indicating it, and, for example, prompts him/her to set a security level.

The first embodiment does not particularly limit access to address book data downloaded and saved on the multi-function device 120.

In the following description, the multi-function device 120 and address book management server 100 will be abbreviated as the MFP (Multi Function Peripheral) 120 and SRV 100, respectively.

In step S200, the MFP 120 authenticates the user by accepting, on the basis of the user's operation at the operation unit 124, input of authentication information necessary to use the MFP 120.

In step S201, the MFP 120 accepts, on the basis of the user's operation at the operation unit 124, input of access information such as address information necessary to access the address book management program 102 on the SRV 100. The MFP 120 issues an access request to the SRV 100 using the input access information. This access request includes pieces of information for specifying the MFP 120 and user.

In step S202, on the basis of the access request from the MFP 120, the SRV 100 performs an authentication process to use the address book management program 102.

In step S203, when the SRV 100 completes the authentication process, the address book management program 102 transmits an access completion notification indicating it to the MFP 120.

In step S204, the MFP 120 receives the access completion notification transmitted from the address book management program 102 on the SRV 100.

In step S205, the MFP 120 transmits an address book data download request to the address book management program 102 on the SRV 100.

In step S206, the address book management program 102 on the SRV 100 receives the address book data download request transmitted from the MFP 120.

In step S207, the address book management program 102 on the SRV 100 transmits a user authority request to acquire the authority of the user of the MFP 120 which has transmitted the address book data download request.

In step S208, the MFP 120 receives the user authority request transmitted from the address book management program 102 on the SRV 100.

In step S209, the MFP 120 acquires the authority of the user authenticated in step S200 and transmits it to the address book management program 102 on the SRV 100.

In step S210, the address book management program 102 on the SRV 100 receives the authority of the user of the MFP 120. This user authority changes not only between users but also between MFPs to download an address book.

The address book management program 102 on the SRV 100 determines in step S211 whether the received user authority is administrator authority. If the received user authority is administrator authority (YES in step S211), the process advances to step S212. In step S212, the address book management program 102 on the SRV 100 downloads, to the MFP 120, the entire address book data which the MFP 120 has requested in step S206 to download irrespective of a security level assigned to each address information. That is, in this case, the address book management program 102 on the SRV 100 downloads address book data 202 having the same contents as those of the address book data 200 to the MFP 120.

If the received user authority is not the administrator authority (NO in step S211), the process advances to step S213. In step S213, the address book management program 102 on the SRV 100 extracts only address information of "low" security level from the address book data which the MFP 120 has requested in step S206 to download. The address book management program 102 downloads the extracted address information to the MFP 120. That is, in this case, the address book management program 102 on the SRV 100 downloads, of the address book data 200, address book data 201 of "low" security level to the MFP 120.

In step S214, the MFP 120 receives the address book data containing all address information downloaded in step S212. Alternatively, the MFP 120 receives the address book data containing address information of "low" security level downloaded in step S213.

In step S215, the memory unit 126 of the MFP 120 saves the received address book data, and the process ends.

With the above process, the address book management system in the first embodiment downloads address book data corresponding to the user authority for the multi-function device 120 from the address book management server 100 to the multi-function device 120.

It is preferable to erase the downloaded address book data after completing the transmission process, using that address book data, by the multi-function device 120 so as to maintain security. This case may adopt an erase method which not only deletes a FAT but also overwrites predetermined data (random data or "0" data) on the data itself so as to make it hard to reread the erased data.

An upload process for uploading address book data from the multi-function device 120 to the address book management server 100 in the address book management system will be explained next with reference to FIGS. 3A and 3B.

Figure 3A:
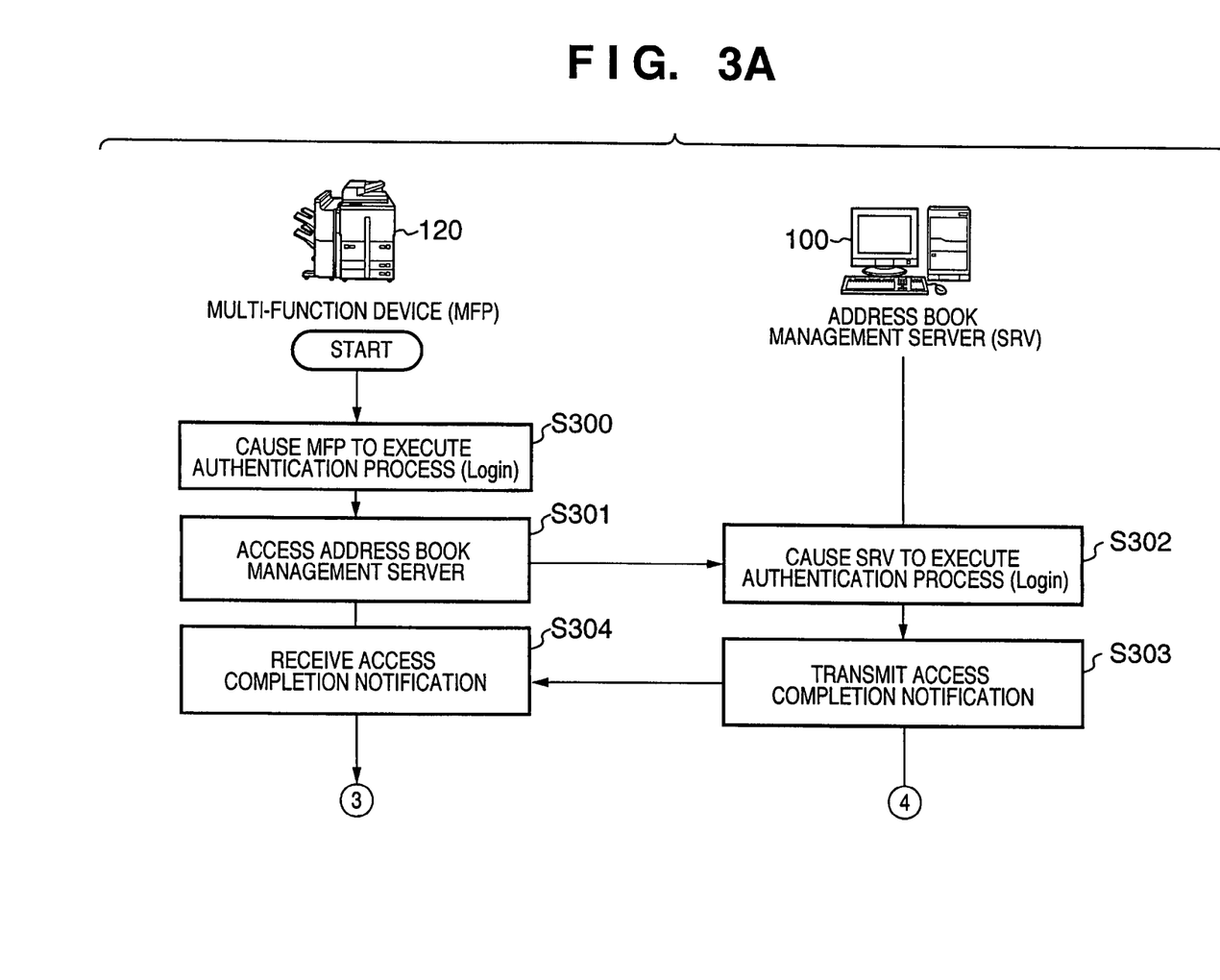
FIGS. 3A and 3B are flowcharts showing an upload process in the address book management system according to the first embodiment of the present invention.
Figure 3B:
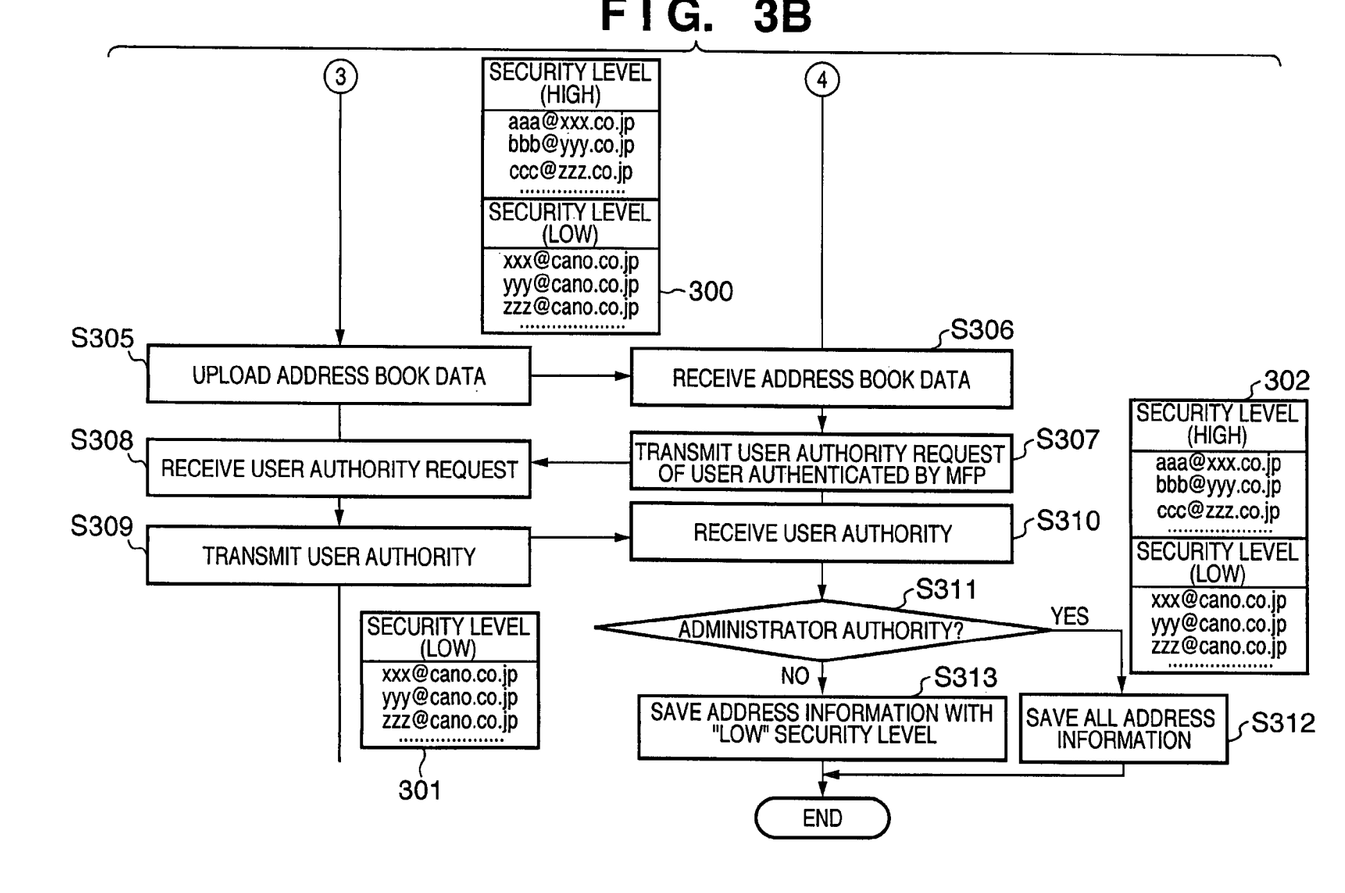

FIGS. 3A and 3B are flowcharts showing the upload process in the address book management system according to the first embodiment of the present invention.

In the following description, the multi-function device 120 and address book management server 100 will be abbreviated as the MFP 120 and SRV 100, respectively.

In step S300, the MFP 120 authenticates the user by accepting, on the basis of the user's operation at the operation unit 124, input of authentication information necessary to use the MFP 120.

In step S301, the MFP 120 accepts, on the basis of the user's operation at the operation unit 124, an input of access information such as address information necessary to access the address book management program 102 on the SRV 100. The MFP 120 issues an access request to the SRV 100 using the input access information.

In step S302, on the basis of the access request from the MFP 120, the SRV 100 performs an authentication process to use the address book management program 102.

In step S303, when the SRV 100 completes the authentication process, the address book management program 102 transmits an access completion notification indicating it to the MFP 120.

In step S304, the MFP 120 receives the access completion notification transmitted from the address book management program 102 on the SRV 100.

In step S305, the MFP 120 uploads the address book data to the address book management program 102 on the SRV 100.

Note that in step S305, the MFP 120 uploads the entire address book data saved in it to the SRV 100 irrespective of the user authority for the MFP 120 and the user authority set for each address information of the address book data. In this case, the MFP 120 transmits address book data 300.

In step S306, the SRV 100 receives the address book data transmitted from the MFP 120.

In step S307, the SRV 100 transmits a user authority request to acquire the authority of the user of the MFP 120.

In step S308, the MFP 120 receives the user authority request from the SRV 100.

In step S309, the MPP 120 acquires the authority of the user authenticated in step S300 and transmits it to the address book management program 102 on the SRV 100.

In step S310, the address book management program 102 on the SRV 100 receives the authority of the user of the MFP 120.

The address book management program 102 on the SRV 100 determines in step S311 whether the received user authority is administrator authority. If the received user authority is administrator authority (YES in step S311), the process advances to step S312. In step S312, the address book management program 102 on the SRV 100 saves, in the database 103 of the SRV 100, the entire address book data uploaded from the MFP 120 in step S306, irrespective of a security level assigned to each address information. That is, in this case, the address book management program 102 on the SRV 100 saves, in the database 103, address book data 302 having the same contents as those of the address book data 300.

If the received user authority is not the administrator authority (NO in step S311), the process advances to step S313. In step S313, the address book management program 102 on the SRV 100 extracts only address information of "low" security level from the address book data uploaded from the MFP 120 in step S306. The address book management program 102 saves the extracted address information in the database 103, and the process ends. That is, in this case, the address book management program 102 on the SRV 100 saves, of the address book data 300, address book data 301 of "low" security level in the database 103.

As described above, according to the first embodiment, the address book management server compares a security level set for address information with the user authority for a device which has issued an access request. On the basis of the comparison result, the address book management server downloads, to the device, address book data containing address information of security level corresponding to the user authority.

Hence, even when the user can access the address book management server from the multi-function device, the user authority to use the multi-function device can limit the contents of address information of address book data to be downloaded. It is therefore possible to set different types of address information not only for each user but also for each MFP used by the user. It is preferable to set authority for an MFP in accordance with its installation location. This makes it possible to improve security of address book data. Moreover, the address book management server does not register identical address information twice. It is therefore possible to decrease the number of pieces of registered address information, thus reducing their accumulation amount.

Second Embodiment

The second embodiment is different from the first embodiment in that a multi-function device 120 also refers to security levels assigned to pieces of address information contained in address book data and manages them in association with the user authority for the multi-function device 120. This arrangement will be described below.

A transmission process for causing the multi-function device 120 included in an address book management system to refer to address book data and transmit a document will be explained below with reference to FIG. 4.

Figure 4:
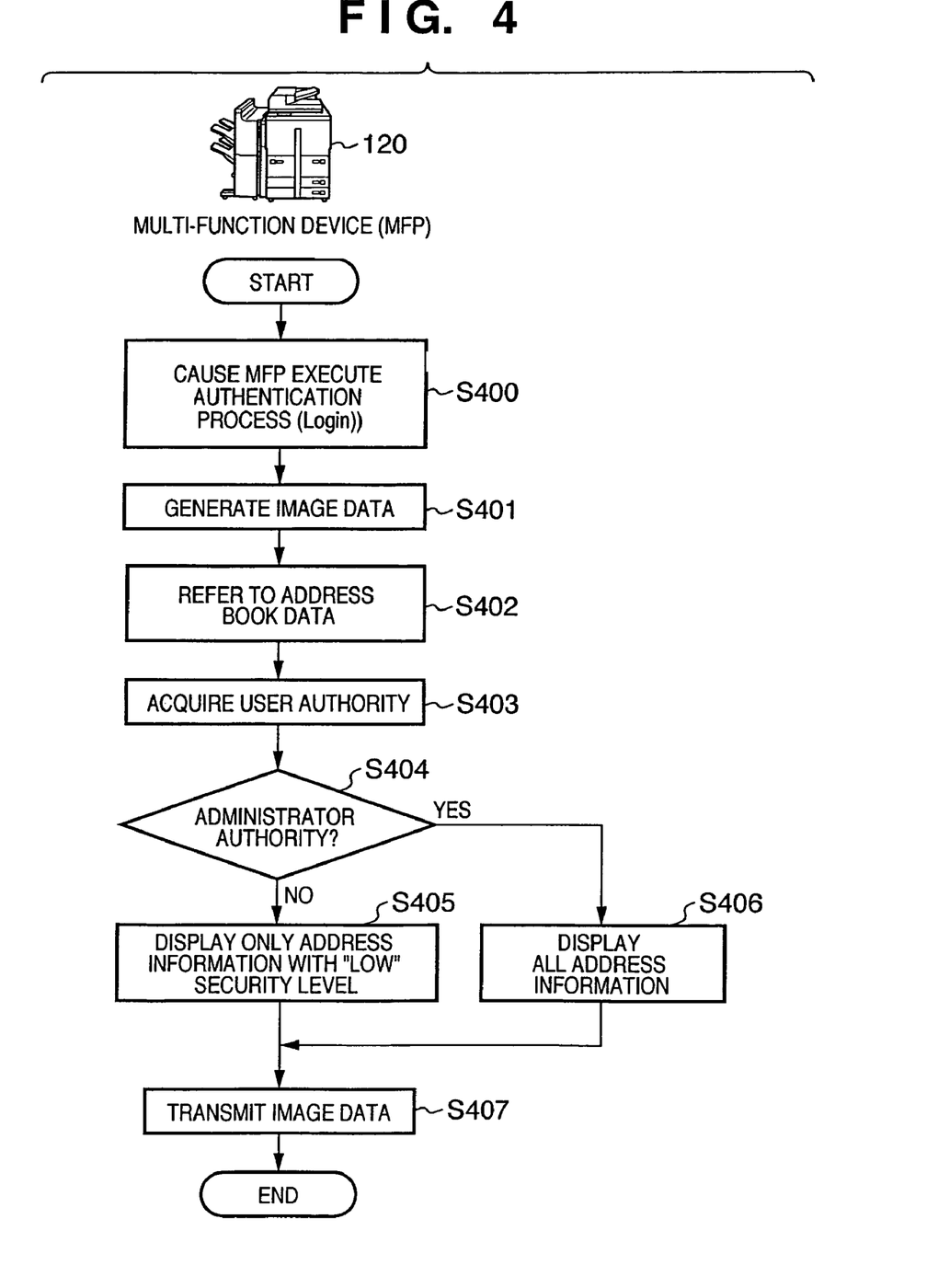
FIG. 4 is a flowchart showing a transmission process in an address book management system according to the second embodiment of the present invention.

FIG. 4 is a flowchart showing the transmission process in the address book management system according to the second embodiment of the present invention.

In the following description, the multi-function device 120 and address book management server 100 will be abbreviated as the MFP 120 and SRV 100, respectively.

In step S400, the MFP 120 authenticates the user by accepting, on the basis of the user's operation at an operation unit 124, input of authentication information necessary to use the MFP 120.

In step S401, the MFP 120 selects an arbitrary input mode on the basis of the user's operation at the operation unit 124. Assume that the MFP 120 selects, as the input mode, input from a scanner unit 127. The scanner unit 127 scans a document to generate image data via an image input/output control unit 121. A memory unit 126 accumulates the generated image data.

In step S402, on the basis of the user's operation at the operation unit 124, the MFP 120 refers to address book data for designating a destination address to which the user transmits the image data.

In step S403, the MFP 120 acquires the authority of the user authenticated in step S400.

The MFP 120 determines in step S404 whether the acquired user authority is administrator authority. If the acquired user authority is administrator authority (YES in step S404), the process advances to step S405. In step S405, in response to the address book reference request by the operation in step S402, the MFP 120 displays the entire address book data saved in it, irrespective of a security level assigned to each address information.

If the acquired user authority is not the administrator authority (NO in step S404), the process advances to step S406. In step S406, in response to the address book reference request by the operation in step S402, the MFP 120 extracts and displays only address information of "low" security level from the address book data saved in it.

In step S407, the MFP 120 accepts selection of an arbitrary address from the address book data displayed on the operation unit 124 of the MFP 120 in step S405 or S406. The MFP 120 then transmits, to the selected address, the image data generated and saved in the memory unit 126 in step S401, and the process ends.

An editing process for causing the multi-function device 120 included in the address book management system to edit address book data will be explained next with reference to FIG. 5.

Figure 5:
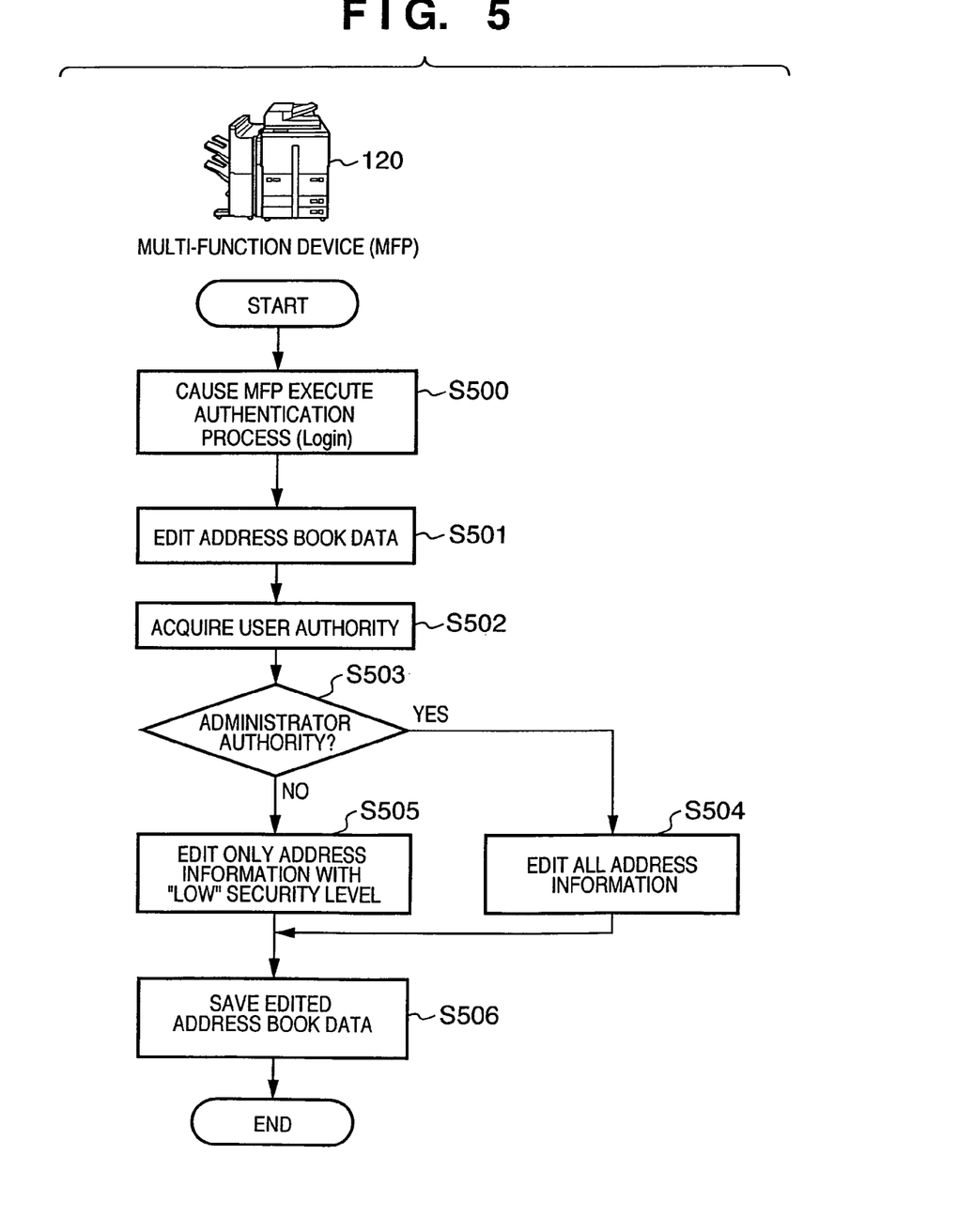
FIG. 5 is a flowchart showing an editing process in the address book management system according to the second embodiment of the present invention.

FIG. 5 is a flowchart showing the editing process in the address book management system according to the second embodiment of the present invention.

In the following description, the multi-function device 120 and address book management server 100 will be abbreviated as the MFP 120 and SRV 100, respectively.

In step S500, the MFP 120 authenticates the user by accepting, on the basis of the user's operation at the operation unit 124, input of authentication information necessary to use the MFP 120.

In step S501, on the basis of the user's operation at the operation unit 124, the MFP 120 starts an address book data editing mode to edit (add, delete, or change address information) address book data saved in the memory unit 126 of the MFP 120.

In step S502, the MFP 120 acquires the authority of the user authenticated in step S500.

The MFP 120 determines in step S503 whether the acquired user authority is administrator authority. If the acquired user authority is administrator authority (YES in step S503), the process advances to step S504. In step S504, in response to the address book editing request by the operation in step S501, the MFP 120 determines, as the editing target, the entire address book data saved in it, irrespective of a security level assigned to each address information. In this case, the MFP 120 displays an editing window for editing address book data containing the address information to be edited.

If the acquired user authority is not the administrator authority (NO in step S503), the process advances to step S505. In step S505, in response to the address book editing request by the operation in step S501, the MFP 120 extracts and determines, as the editing target, only address information of "low" security level from the address book data saved in it. In this case, the MFP 120 displays an editing window for editing address book data containing the address information to be edited.

In step S506, the MFP 120 saves, in the memory unit 126, the address book data edited via the operation unit 124 of the MFP 120 in step S504 or S505, and the process ends.

An upload process for uploading address book data from the multi-function device 120 to the address book management server 100 in the address book management system will be explained next with reference to FIGS. 6A and 6B.

Figure 6A:
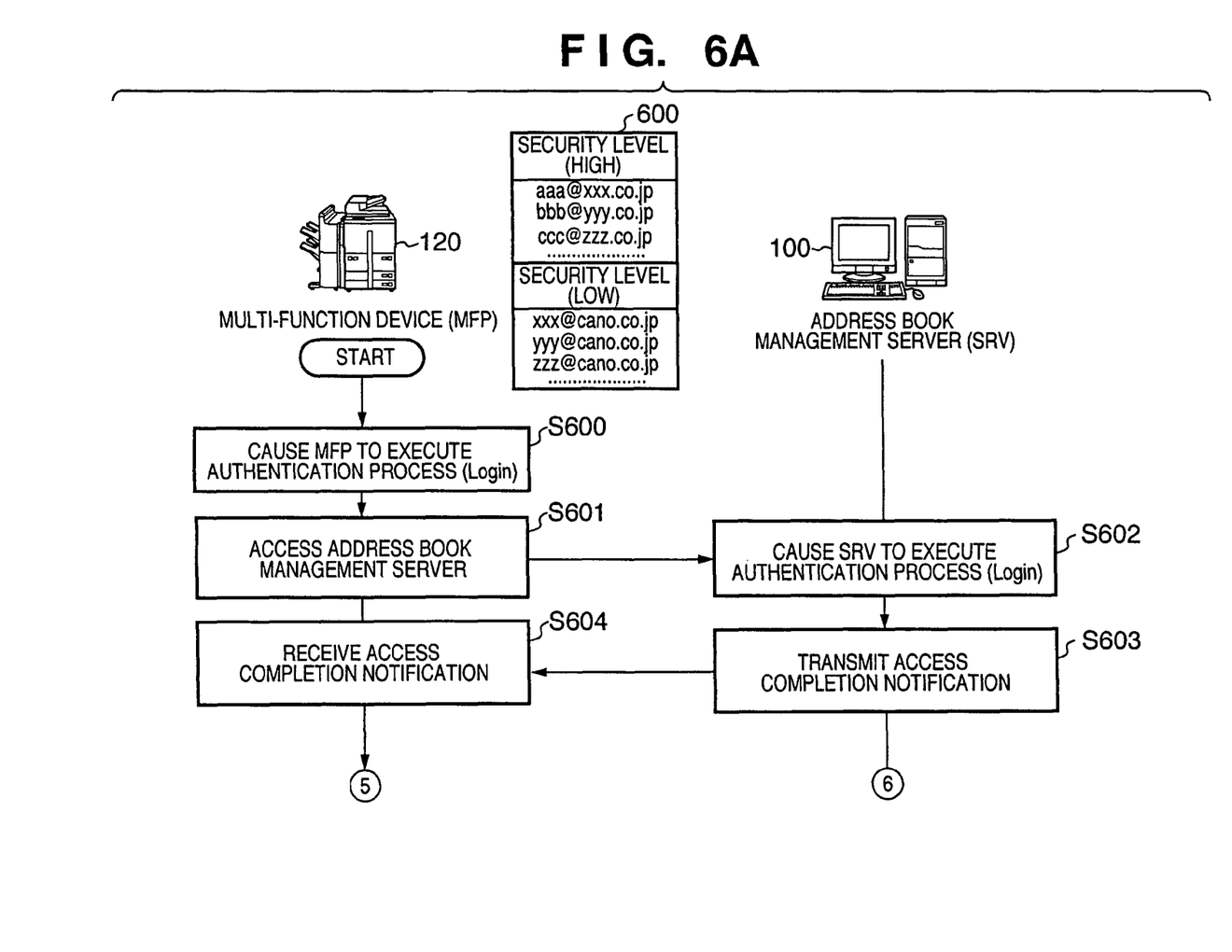
FIGS. 6A and 6B are flowcharts showing an upload process in the address book management system according to the second embodiment of the present invention.
Figure 6B:
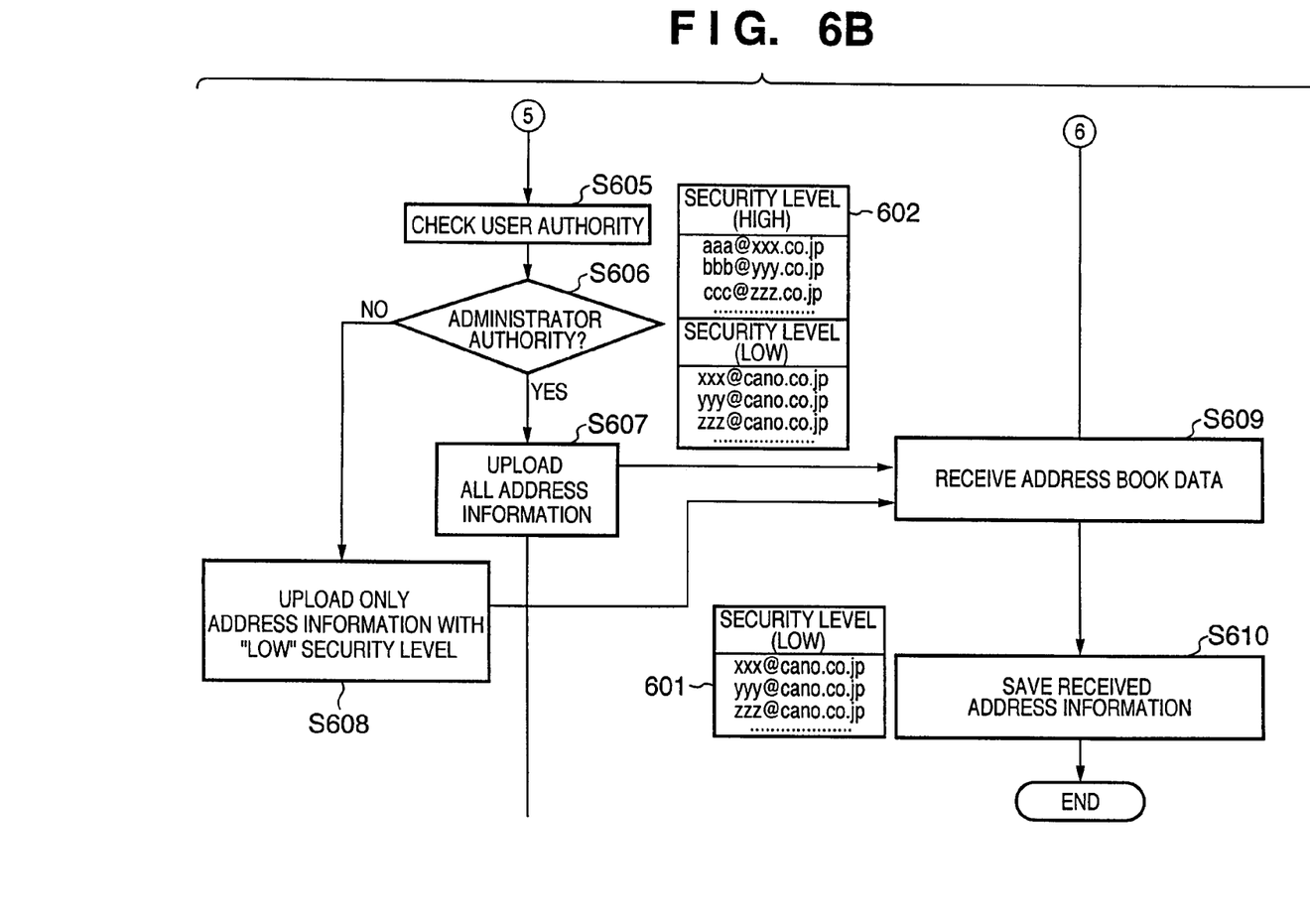

FIGS. 6A and 6B are flowcharts showing the upload process in the address book management system according to the second embodiment of the present invention.

Appropriate security levels are assigned in advance to pieces of address information contained in address book data 600 saved in the memory unit 126 of the MFP 120. Each security level defines user authority for a usable multi-function device 120.

The second embodiment employs two security levels, i.e., high and low. A user who has the administrator authority for the multi-function device 120 can use address information of any security level. User authority of any other type allows use of only address information of low security level.

In the following description, the multi-function device 120 and address book management server 100 will be abbreviated as the MFP 120 and SRV 100, respectively.

In step S600, the MFP 120 authenticates the user by accepting, on the basis of the user's operation at the operation unit 124, input of authentication information necessary to use the MFP 120.

In step S601, the MFP 120 accepts, on the basis of the user's operation at the operation unit 124, input of access information such as address information necessary to access the address book management program 102 on the SRV 100. The MFP 120 issues an access request to the SRV 100 using the input access information.

In step S602, on the basis of the access request from the MFP 120, the SRV 100 performs an authentication process necessary to use the address book management program 102.

In step S603, when the SRV 100 completes the authentication process, the address book management program 102 transmits an access completion notification indicating it to the MFP 120.

In step S604, the MFP 120 receives the access completion notification transmitted from the address book management program 102 on the SRV 100.

In step S605, the MFP 120 acquires the authority of the user authenticated in step S600.

The MFP 120 determines in step S606 whether the acquired user authority on the MFP 120 is administrator authority. If the acquired user authority is administrator authority (YES in step S606), the process advances to step S607. In step S607, the MFP 120 uploads the entire address book data saved in it to the SRV 100, irrespective of a security level assigned to each address information. That is, the MFP 120 uploads address book data 602 having the same contents as those of the address book data 600 to the SRV 100.

If the acquired user authority is not the administrator authority (NO in step S606), the process advances to step S608. In step S608, the MFP 120 extracts and uploads, to the address book management program 102 on the SRV 100, only address information of "low" security level from the address book data saved in it. That is, in this case, the MFP 120 uploads, of the address book data 600, address book data 601 of "low" security level to the SRV 100.

In step S609, the SRV 100 receives the address book data uploaded from the MFP 120 in step S607 or S608.

In step S610, the SRV 100 saves the received address book data in the database 103, and the process ends.

As described above, according to the second embodiment, the multi-function device sets security levels for pieces of address information contained in address book data and associates the security levels set for the pieces of address information with the authority of the user who uses the multi-function device.

In response to a request from the user, the multi-function device uploads, to the address book management program, the generated address book data together with the security levels added to the pieces of address information and the user authority associated with the security levels. This makes it possible to cause the address book management server to manage address book data generated and edited by the multi-function device in the same manner as that created and edited on the address book management program. This results in an increase in user's convenience.

The multi-function device saves downloaded address book data together with a security level set for address information and associated user authority. When the user is to refer to the address book data, the address book management server acquires the user authority to use the multi-function device and compares that user authority with the security level set for the address information. On the basis of the comparison result, the address book management server extracts address information of security level corresponding to the user authority associated in advance and enables the user to refer to only address book data containing that address information. Hence, of the downloaded address book data, the user can refer to only address information of security level corresponding to his/her user authority. This promises a further improvement in security.

The above embodiments have exemplified the case in which the address book management server manages a mail address as the address book data. However, the present invention is not limited to this. It is also possible to manage a plurality of types of address information such as a fax number and IP address.

Moreover, although the above embodiments use two security levels, i.e., "high" and "low", it is also possible to set three or more security levels. Alternatively, information (e.g., a predetermined group) other than a security level may be set for address information.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a storage medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-351313 filed on Dec. 5, 2005, which is hereby incorporated by reference herein in its entirety.

What is claimed is:

1. An information processing apparatus which is connected, via a network, to a data communication apparatus that transmits data in accordance with e-mail address information, and manages the e-mail address information used by the data communication apparatus, comprising:
a first storage unit constructed to store address book data including a plurality of e-mail address information, wherein each of the plurality of e-mail address information is assigned to any one of a plurality of security levels, and the security levels are used to determine whether to process respective e-mail address information in the information processing apparatus;
a first reception unit constructed to receive an address book data download request issued from the data communication apparatus;
a first extraction unit constructed to extract e-mail address information, from the address book data, which is set with the security level corresponding to user authority of a user of the data communication apparatus which has issued the address book data download request; and
a transmission unit constructed to transmit the e-mail address information extracted by said first extraction unit to the data communication apparatus,
wherein the information processing apparatus processes e-mail address information for transmission to the data communication apparatus according to the security levels,
wherein the data communication apparatus transmits data to destinations identified by the e-mail address information transmitted from the information processing apparatus,
wherein the information processing apparatus processes e-mail address information which is set with the security level corresponding to the user authority, and
wherein the information processing apparatus does not processes e-mail address information which is not set with the security level corresponding to the user authority.

2. The apparatus according to claim 1, further comprising:
a second reception unit constructed to receive the address book data from the data communication apparatus;
a second extraction unit constructed to extract e-mail address information from the address book data on the basis of user authority of a user of the data communication apparatus which has issued the address book data received by said second reception unit; and
a second storage unit constructed to store address book data containing the e-mail address information extracted by said second extraction unit.

3. The apparatus according to claim 1, wherein the information processing apparatus processes the e-mail address information which is set with the security level corresponding to the user authority by extracting the e-mail address information from the address book data.

4. A data communication apparatus including a data transmission unit and an operation unit which accepts a user's operation, comprising:
a first storage unit constructed to store address book data including a plurality of e-mail address information, wherein each of the plurality of e-mail address information is assigned to any one of a plurality of security levels, and the security levels are used to determine whether to process respective e-mail address information in the data communication apparatus;

a first acquisition unit constructed to acquire user authority of a user of the data communication apparatus on the basis of the operation at the operation unit;

a first extraction unit constructed to extract e-mail address information, from the address book data, which is set with the security level corresponding to the user authority acquired by said first acquisition unit; and a first display unit constructed to display the e-mail address information extracted by said first extraction unit, wherein the data communication apparatus processes e-mail address information for transmission of data to destinations identified by the processed e-mail address information, the processing being performed according to the security levels, wherein the data communication apparatus processes e-mail address information which is set with the security level corresponding to the user authority, and wherein the data communication apparatus does not processes e-mail address information which is not set with the security level corresponding to the user authority.

5. The apparatus according to claim 4, further comprising:

a second acquisition unit constructed to acquire user authority of a user of the data communication apparatus on the basis of the operation at the operation unit when the user inputs an editing instruction for the address book data via the operation unit;

a second extraction unit constructed to extract e-mail address information from the address book data on the basis of the user authority acquired by said second acquisition unit and the security level set for each e-mail address information in the address book data; and a second display unit constructed to display an editing window for editing address book data containing the e-mail address information extracted by said second extraction unit.

6. The apparatus according to claim 4, further comprising a transmission unit constructed to transmit the address book data containing the e-mail address information extracted by said first extraction unit to an information processing apparatus which is connected via a network and manages e-mail address information.

7. The apparatus according to claim 4, wherein the data communication apparatus processes the e-mail address information which is set with the security level corresponding to the user authority by extracting the e-mail address information from the address book data.

8. An address management system formed by connecting, via a network, a data communication apparatus including a data transmission unit and an information processing apparatus which manages e-mail address information used by the data communication apparatus, the information processing apparatus including a storage unit constructed to store address book data including a plurality of e-mail address information, wherein each of the plurality of e-mail address information is assigned to any one of a plurality of security levels, and the security levels are used to determine whether to process respective e-mail address information in the information processing apparatus, a first reception unit constructed to receive an address book data download request issued from the data communication apparatus, an extraction unit constructed to extract e-mail address information, from the address book data, which is set with the security level corresponding to user authority of a user of the data communication apparatus which has issued the address book data download request, and a first transmission unit constructed to transmit the e-mail address information extracted by said extraction unit to the data communication apparatus; and the data communication apparatus including a second transmission unit constructed to transmit authority of a user of the data communication apparatus to the information processing apparatus, and a second reception unit constructed to receive the e-mail address information corresponding to the user authority from the information processing apparatus, wherein the information processing apparatus processes e-mail address information for transmission to the data communication apparatus according to the security levels, wherein the data communication apparatus transmits data to destinations identified by the e-mail address information transmitted from the information processing apparatus, wherein the information processing apparatus processes e-mail address information which is set with the security level corresponding to the user authority, and wherein the information processing apparatus does not processes e-mail address information which is not set with the security level corresponding to the user authority.

9. A method of controlling an information processing apparatus which is connected, via a network, to a data communication apparatus including a data transmission unit, and manages e-mail address information used by the data communication apparatus, comprising steps of:

storing address book data including a plurality of e-mail address information, wherein each of the plurality of e-mail address information is assigned to any one of a plurality of security levels, and the security levels are used to determine whether to process respective e-mail address information in the information processing apparatus;

receiving an address book data download request issued from the data communication apparatus;

extracting e-mail address information, from the address book data, which is set with the security level corresponding to user authority of a user of the data communication apparatus which has issued the address book data download request; and transmitting the e-mail address information extracted in the extracting step to the data communication apparatus, wherein the information processing apparatus processes e-mail address information for transmission to the data communication apparatus according to the security levels, wherein the data communication apparatus transmits data to destinations identified by the e-mail address information transmitted from the information processing apparatus, wherein the information processing apparatus processes e-mail address information which is set with the security level corresponding to the user authority, and wherein the information processing apparatus does not processes e-mail address information which is not set with the security level corresponding to the user authority.

10. A computer-readable storage medium storing a computer-executable program for causing a computer to control an information processing apparatus which is connected, via a network, to a data communication apparatus including a data transmission unit, and manages e-mail address information used by the data communication apparatus, the program causing the computer to execute steps of:

storing address book data including a plurality of e-mail address information, wherein each of the plurality of e-mail address information is assigned to any one of a plurality of security levels, and the security levels are used to determine whether to process respective e-mail address information in the information processing apparatus;

receiving an address book data download request issued from the data communication apparatus;

extracting e-mail address information, from the address book data, which is set with the security level corresponding to user authority of a user of the data communication apparatus which has issued the address book data download request; and transmitting the e-mail address information extracted in the extracting step to the data communication apparatus, wherein the information processing apparatus processes e-mail address information for transmission to the data communication apparatus according to the security levels, wherein the data communication apparatus transmits data to destinations identified by the e-mail address information transmitted from the information processing apparatus, wherein the information processing apparatus processes e-mail address information which is set with the security level corresponding to the user authority, and wherein the information processing apparatus does not processes e-mail address information which is not set with the security level corresponding to the user authority.

11. A method of controlling a data communication apparatus including a data transmission unit and an operation unit which accepts a user's operation, comprising steps of:

storing address book data including a plurality of e-mail address information, wherein each of the plurality of e-mail address information is assigned to any one of a plurality of security levels, and the security levels are used to determine whether to process respective e-mail address information in the data communication apparatus;

acquiring user authority of a user of the data communication apparatus on the basis of the operation at the operation unit;

extracting e-mail address information, from the address book data, which is set with the security level corresponding to the user authority acquired in the acquiring step; and displaying the e-mail address information extracted in the extracting step, wherein the data communication apparatus processes e-mail address information for transmission of data to destinations identified by the processed e-mail address information, the processing being performed according to the security levels, wherein the data communication apparatus processes e-mail address information which is set with the security level corresponding to the user authority, and wherein the data communication apparatus does not processes e-mail address information which is not set with the security level corresponding to the user authority.

12. A computer-readable storage medium storing a computer-executable program for causing a computer to control a data communication apparatus including a data transmission unit and an operation unit which accepts a user's operation, the program causing the computer to execute steps of:

storing address book data including a plurality of e-mail address information, wherein each of the plurality of e-mail address information is assigned to any one of a plurality of security levels, and the security levels are used to determine whether to process respective e-mail address information in the data communication apparatus;

acquiring user authority of a user of the data communication apparatus on the basis of the operation at the operation unit;

extracting e-mail address information, from the address book data, which is set with the security level corresponding to the user authority acquired in the acquiring step; and displaying the e-mail address information extracted in the extracting step, wherein the data communication apparatus processes e-mail address information for transmission of data to destinations identified by the processed e-mail address information, the processing being performed according to the security levels, wherein the data communication apparatus processes e-mail address information which is set with the security level corresponding to the user authority, and wherein the data communication apparatus does not processes e-mail address information which is not set with the security level corresponding to the user authority.

* * * * *